(12) United States Patent
Adams et al.

(10) Patent No.: US 12,149,572 B2
(45) Date of Patent: Nov. 19, 2024

(54) PROGRAMMATICAL PSTN TRUNKING FOR CLOUD HOSTED APPLICATIONS

(71) Applicant: Level 3 Communications, LLC, Broomfield, CO (US)

(72) Inventors: Kimberly Adams, Westerville, OH (US); Anne Kempen, Denver, CO (US); Joseph A. Scivicque, Lafayette, LA (US); Adam Uzelac, Rochester, NY (US)

(73) Assignee: Level 3 Communications, LLC, Denver, CO (US)

( * ) Notice: Subject to any disclaimer, the term of this patent is extended or adjusted under 35 U.S.C. 154(b) by 349 days.

(21) Appl. No.: 17/670,690

(22) Filed: Feb. 14, 2022

(65) Prior Publication Data

US 2023/0120058 A1   Apr. 20, 2023

Related U.S. Application Data

(60) Provisional application No. 63/255,780, filed on Oct. 14, 2021.

(51) Int. Cl.
*H04L 65/1063* (2022.01)
*H04L 65/1096* (2022.01)
*H04M 3/42* (2006.01)
*H04M 7/00* (2006.01)

(52) U.S. Cl.
CPC ...... *H04L 65/1096* (2013.01); *H04L 65/1063* (2013.01); *H04M 3/42102* (2013.01); *H04M 3/4217* (2013.01); *H04M 7/0057* (2013.01)

(58) Field of Classification Search
CPC ............ H04L 65/1096; H04L 65/1063; H04M 3/4217; H04M 7/0057
USPC ....................................................... 370/259
See application file for complete search history.

(56) References Cited

U.S. PATENT DOCUMENTS

| | | | |
|---|---|---|---|
| 2006/0072593 A1* | 4/2006 | Grippo | H04L 12/66 370/235 |
| 2007/0147358 A1* | 6/2007 | Mikleton | H04M 7/128 370/356 |
| 2012/0106727 A1* | 5/2012 | Kaushal | H04Q 3/0016 379/211.01 |

(Continued)

*Primary Examiner* — Ahmad F. Matar
*Assistant Examiner* — Jirapon Tulop

(57) ABSTRACT

Novel tools and techniques are provided for implementing programmatical public switched telephone network ("PSTN") trunking for cloud hosted applications. In various embodiments, a computing system may determine one or more first network interconnection characteristics associated with a first entity service provider within a call service network operated by a call network service provider. Based on the determined one or more first network interconnection characteristics associated with the first entity service provider, the computing system may cause a network provisioning application layer to establish one or more network interconnections between a first network associated with the first entity service provider and the call service network, in some cases, by establishing shared peering connections between the first network and the call service network. The shared peering connections may enable a plurality of customers of the first entity service provider to establish call service connections that are shared over the shared peering connections.

19 Claims, 13 Drawing Sheets

(56) References Cited

U.S. PATENT DOCUMENTS

2019/0132152 A1* 5/2019 Wang ................. H04L 12/4645
2021/0168052 A1* 6/2021 Parulkar ................ H04L 67/10

* cited by examiner

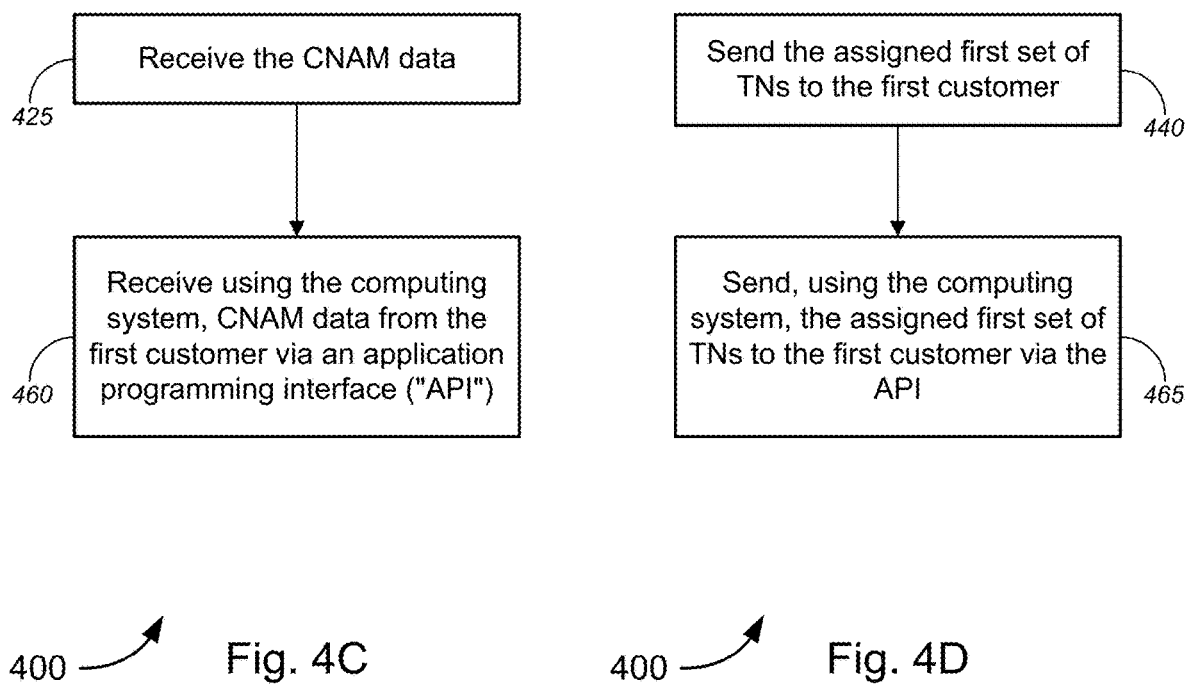

PROGRAMMATICAL PSTN TRUNKING FOR CLOUD HOSTED APPLICATIONS

CROSS-REFERENCES TO RELATED APPLICATIONS

This application claims priority to U.S. Patent Application Ser. No. 63/255,780 (the "'780 Application"), filed Oct. 14, 2021, by Kimberly Adams et al., entitled, "Programmatical PSTN Trunking for Cloud Hosted Applications," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing service provisioning, and, more particularly, to methods, systems, and apparatuses for implementing programmatical public switched telephone network ("PSTN") trunking for cloud hosted applications.

BACKGROUND

Conventional public switched telephone network ("PSTN") provisioning systems establish customer-specific peering connections between a third party service provider network and a PSTN provider network. Although the customer-specific peering connections allow for dedicated peering connections to be established for call connections for each individual customer (and their customer device(s)), such customer-specific peering connections are susceptible to peering connection failures that would negatively affect (in some cases, prevent) call services for the customer associated with the affected customer device. Further, from the service provider perspective, unused peering connections result in inefficient use of resources, in this case, peering connections between the third party service provider network and the PSTN provider network.

Hence, there is a need for more robust and scalable solutions for implementing service provisioning, and, more particularly, to methods, systems, and apparatuses for implementing programmatical PSTN trunking for cloud hosted applications.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4D are flow diagrams illustrating a method for implementing programmatical PSTN trunking for cloud hosted applications, in accordance with various embodiments.

DETAILED DESCRIPTION OF CERTAIN EMBODIMENTS

Overview

Figure 1A:
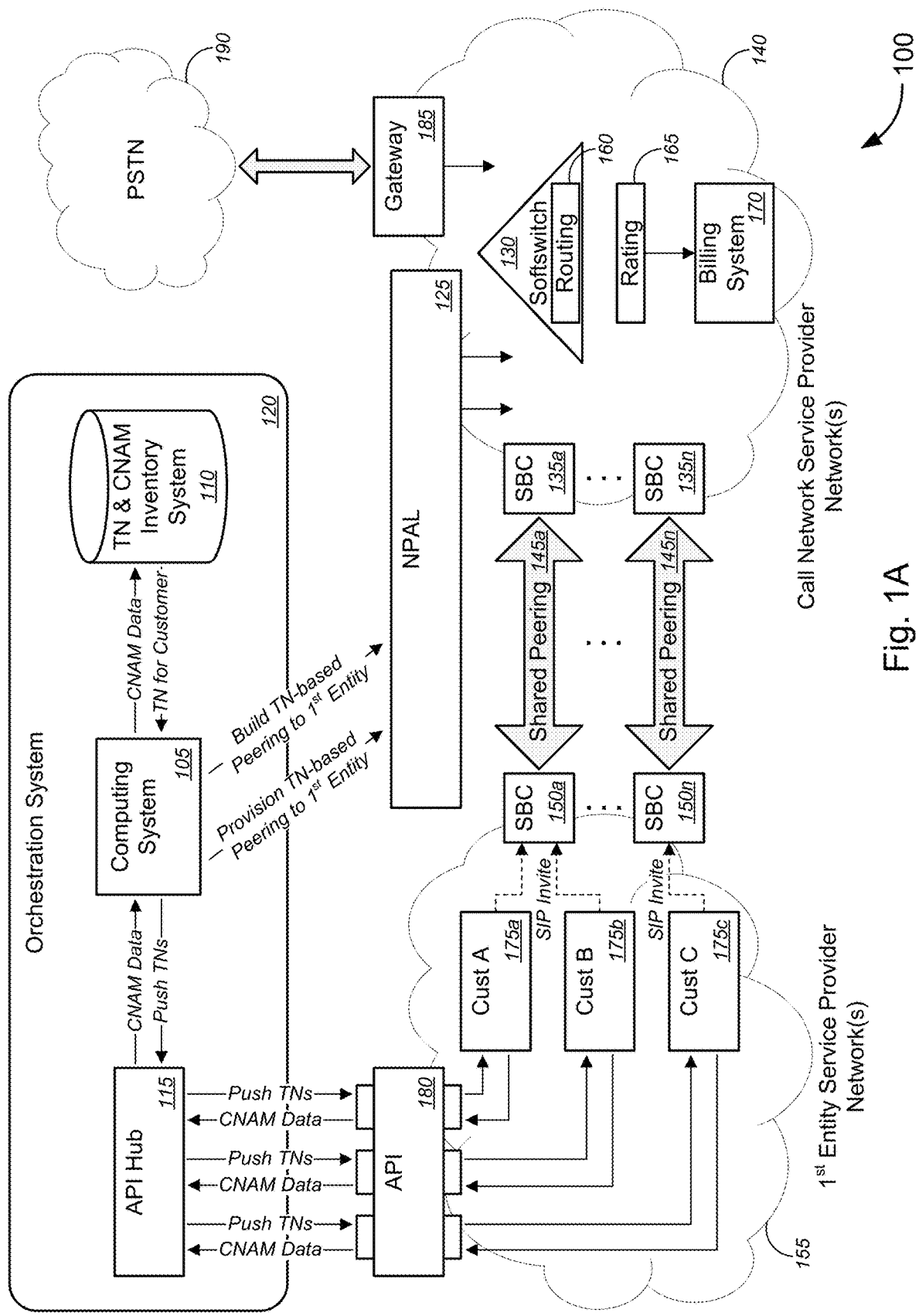
FIG. 1A is a schematic diagram illustrating a system for implementing programmatical public switched telephone network ("PSTN") trunking for cloud hosted applications, in accordance with various embodiments.

Various embodiments provide tools and techniques for implementing service provisioning, and, more particularly, to methods, systems, and apparatuses for implementing programmatical public switched telephone network ("PSTN") trunking for cloud hosted applications.

In various embodiments, a computing system may determine one or more first network interconnection characteristics associated with a first entity service provider within a call service network operated by a call network service provider. Based on the determined one or more first network interconnection characteristics associated with the first entity service provider, the computing system may cause a NPAL to establish one or more network interconnections between a first network associated with the first entity service provider and the call service network, in some cases, by establishing shared peering connections between the first network and the call service network. The shared peering connections may enable a plurality of customers of the first entity service provider to establish call service connections that are shared over the shared peering connections.

According to some embodiments, the call service connections may enable session initiation protocol ("SIP")-based communication. In some cases, the SIP-based communication may include, without limitation, at least one of a voice over Internet Protocol ("VoIP") call, an IP-based video call, or an instant message over IP, and/or the like. Alternatively, or additionally, the call service connections may enable a PSTN-based communication. In some instances, the call service connections may be shared and multiplexed over the shared peering connections for two or more of the plurality of customers.

In some embodiments, establishing the shared peering connections may comprise building trunk groups between one or more first entity service provider SBCs disposed within the first network and one or more call network service provider SBCs disposed within the call service network.

According to some embodiments, based on the determined one or more first network interconnection characteristics associated with the first entity service provider, the computing system may perform at least one of a routing determination or a rating determination. In some cases, the routing determination may include determination of routing of call data over at least one of the first network, the call service network, or the shared peering connections, and/or the like. In some instances, the rating determination may include determination of costs for establishing call service connections over the at least one of the first network, the call service network, or the shared peering connections, and/or the like.

In some embodiments, in response to receiving a service order from a first customer of the first entity service provider for a call service provided over the call service network operated by the call network service provider, the computing system may receive caller ID name ("CNAM") data from the first customer, may retrieve a first set of telephone numbers ("TNs") from an inventory system, may assign the first set of TNs to the first customer, and may send the assigned first set of TNs to the first customer. In some cases, the computing system may provision TN-based peering between the call service network and one or more user devices associated with the first customer within the first network via the shared peering connections. In some cases, receiving the CNAM data may comprise receiving CNAM data from the first customer via an API. In some instances, sending the assigned first set of TNs to the first customer may comprise sending the assigned first set of TNs to the first customer via the API.

In response to the first customer sending, using customer device, a SIP invite, a call may be established between the customer device and a destination device associated with a called party or destination party, in some cases, via a PSTN, a gateway, a soft switch, SBCs, and a shared peering connection between the SBCs, in some cases, using routing determination.

The programmatical PSTN trunking system provides for establishing shared peering connections between first entity service provider network(s) (e.g., third party networks, vender networks, hoster networks, etc.) and the call network service provider network(s). In some cases, the shared peering connections allow for multiplexing call connections for a plurality of customers of the first entity service provider. The programmatical PSTN trunking system allows for ease of implementation, for the ability to switch peering connections in the case that a trunk group connection fails for particular customers, and for the ability to balance PSTN data flows over the shared peering connections, and/or the like.

These and other aspects of the programmatical PSTN trunking for cloud hosted applications are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, service provisioning technology, network provisioning technology, PSTN service technology, peering technology, and/or the like. In other aspects, certain embodiments, can improve the functioning of user equipment or systems themselves (e.g., service provisioning systems, network provisioning systems, PSTN service systems, peering systems, etc.), for example, by determining, using a computing system, one or more first network interconnection characteristics associated with a first entity service provider within a call service network operated by a call network service provider; and based on the determined one or more first network interconnection characteristics associated with the first entity service provider, causing, using the computing system, a network provisioning application layer ("NPAL") to establish one or more network interconnections between a first network associated with the first entity service provider and the call service network, by establishing, using the computing system, shared peering connections between the first network and the call service network, the shared peering connections enabling a plurality of customers of the first entity service provider to establish call service connections that are shared over the shared peering connections; and/or the like.

In particular, to the extent any abstract concepts are present in the various embodiments, those concepts can be implemented as described herein by devices, software, systems, and methods that involve specific novel functionality (e.g., steps or operations), such as, establishing the one or more network interconnections between the first network associated with the first entity service provider and the call service network, by establishing, using the computing system, shared peering connections between the first network and the call service network, the shared peering connections enabling a plurality of customers of the first entity service provider to establish call service connections that are shared (and in some cases, multiplexed) over the shared peering connections; and/or the like, to name a few examples, that extend beyond mere conventional computer processing operations. These functionalities can produce tangible results outside of the implementing computer system, including, merely by way of example, optimized PSTN trunking system that provides for establishing shared peering connections between first entity service provider network(s) (e.g., third party networks, vender networks, hoster networks, etc.) and the call network service provider network(s), and allows for ease of implementation, for the ability to switch peering connections in the case that a trunk group connection fails for particular customers, and for the ability to balance PSTN data flows over the shared peering connections, and/or the like, at least some of which may be observed or measured by customers and/or service providers.

In an aspect, a method may comprise determining, using a computing system, one or more first network interconnection characteristics associated with a first entity service provider within a call service network operated by a call network service provider; and based on the determined one or more first network interconnection characteristics associated with the first entity service provider, causing, using the computing system, a network provisioning application layer ("NPAL") to establish one or more network interconnections between a first network associated with the first entity service provider and the call service network, by establishing, using the computing system, shared peering connections between the first network and the call service network. The shared peering connections may enable a plurality of customers of the first entity service provider to establish call service connections that are shared over the shared peering connections.

In some embodiments, the computing system may comprise at least one of an orchestrator, a call service provisioning system, a provisioning flow system, a NPAL system, a call controller, a call manager, a media gateway controller, a server, a video call server, an instant messaging server, a network operations center ("NOC"), a centralized provisioning system, or a distributed provisioning system, and/or the like.

According to some embodiments, the call service connections may enable session initiation protocol ("SIP")-based communication. In some cases, the SIP-based communication may comprise at least one of a voice over Internet Protocol ("VoIP") call, an IP-based video call, or an instant message over IP, and/or the like. Alternatively, or additionally, the call service connections may enable a public switch telephone network ("PSTN")-based communication. In some instances, the call service connections may be shared and multiplexed over the shared peering connections for two or more of the plurality of customers.

In some embodiments, establishing the shared peering connections may comprise building trunk groups between one or more first entity service provider session border controllers ("SBCs") disposed within the first network and one or more call network service provider SBCs disposed within the call service network.

According to some embodiments, the method may further comprise, based on the determined one or more first network interconnection characteristics associated with the first entity service provider, performing, using the computing system, at least one of a routing determination or a rating determination. In some cases, the routing determination may comprise determination of routing of call data over at least one of the first network, the call service network, or the shared peering connections, and/or the like. In some instances, the rating determination may comprise determination of costs for establishing call service connections over the at least one of the first network, the call service network, or the shared peering connections, and/or the like.

In some embodiments, the method may further comprise, in response to receiving a service order from a first customer of the first entity service provider for a call service provided over the call service network operated by the call network service provider, receiving, using the computing system, caller ID name ("CNAM") data from the first customer; retrieving, using the computing system, a first set of telephone numbers ("TNs") from an inventory system; assigning, using the computing system, the first set of TNs to the first customer; and sending, using the computing system, the assigned first set of TNs to the first customer; and provisioning, using the computing system, TN-based peering between the call service network and one or more user devices associated with the first customer within the first network via the shared peering connections. In some cases, receiving the CNAM data may comprise receiving, using the computing system, CNAM data from the first customer via an application programming interface ("API"). In some instances, sending the assigned first set of TNs to the first customer may comprise sending, using the computing system, the assigned first set of TNs to the first customer via the API.

According to some embodiments, the one or more first network interconnection characteristics may be based on microservice data, wherein the microservice data may comprise at least one of: data regarding existence of partner validation between the call network service provider and the first entity service provider; data regarding lack of partner validation between the call network service provider and the first entity service provider; data regarding partner peering model attributes comprising at least one of one or more TN attributes, one or more fully qualified domain name ("FQDN") attributes, one or more trunk group ("TGRP") attributes, one or more X-Header attributes, or one or more user identification ("ID") attributes; data regarding existence of a public switch telephone network ("PSTN") provider route plan; data regarding lack of a PSTN provider route plan; data regarding existence of a first entity service provider route plan; data regarding lack of a first entity service provider route plan; data regarding existence of a PSTN provider rating; data regarding lack of a PSTN provider rating; data regarding existence of a rater of the first entity service provider; data regarding lack of a rater of the entity rater; data regarding telephone number ("TN") attributes comprising at least one of one or more TN digit attributes or one or more TN type attributes; data regarding existence of a redundancy model; data regarding lack of a redundancy model; or data regarding redundancy type attributes comprising at least one of one or more geographical attributes per region or overflow attributes; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: determine one or more first network interconnection characteristics associated with a first entity service provider within a call service network operated by a call network service provider; and based on the determined one or more first network interconnection characteristics associated with the first entity service provider, cause a network provisioning application layer ("NPAL") to establish one or more network interconnections between a first network associated with the first entity service provider and the call service network, by establishing shared peering connections between the first network and the call service network, the shared peering connections enabling a plurality of customers of the first entity service provider to establish call service connections that are shared over the shared peering connections.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: determine one or more first network interconnection characteristics associated with a first entity service provider within a call service network operated by a call network service provider; and based on the determined one or more first network interconnection characteristics associated with the first entity service provider, cause a network provisioning application layer ("NPAL") to establish one or more network interconnections between a first network associated with the first entity service provider and the call service network, by establishing shared peering connections between the first network and the call service network, the shared peering connections enabling a plurality of customers of the first entity service provider to establish call service connections that are shared over the shared peering connections.

In some embodiments, the computing system may comprise at least one of an orchestrator, a call service provisioning system, a provisioning flow system, a NPAL system, a call controller, a call manager, a media gateway controller, a server, a video call server, an instant messaging server, a network operations center ("NOC"), a centralized provisioning system, or a distributed provisioning system, and/or the like.

According to some embodiments, the call service connections may enable session initiation protocol ("SIP")-based communication. In some cases, the SIP-based communication may comprise at least one of a voice over Internet Protocol ("VoIP") call, an IP-based video call, or an instant message over IP, and/or the like. Alternatively, or additionally, the call service connections may enable a public switch telephone network ("PSTN")-based communication. In some instances, the call service connections may be shared and multiplexed over the shared peering connections for two or more of the plurality of customers.

In some embodiments, the first set of instructions, when executed by the at least one first processor, may further cause the computing system to: based on the determined one or more first network interconnection characteristics associated with the first entity service provider, perform at least one of a routing determination or a rating determination. In some cases, the routing determination may comprise determination of routing of call data over at least one of the first network, the call service network, or the shared peering connections, and/or the like. In some instances, the rating determination may comprise determination of costs for establishing call service connections over the at least one of the first network, the call service network, or the shared peering connections, and/or the like.

According to some embodiments, the first set of instructions, when executed by the at least one first processor, may further cause the computing system to: in response to receiving a service order from a first customer of the first entity service provider for a call service provided over the call service network operated by the call network service provider, receive caller ID name ("CNAM") data from the first customer; retrieve a first set of telephone numbers ("TNs") from an inventory system; assign the first set of TNs to the first customer; and send the assigned first set of TNs to the first customer; and; and provision TN-based peering between the call service network and one or more user devices associated with the first customer within the first network via the shared peering connections. In some cases, receiving the CNAM data may comprise receiving, using the computing system, CNAM data from the first customer via an application programming interface ("API"). In some instances, sending the assigned first set of TNs to the first customer may comprise sending, using the computing system, the assigned first set of TNs to the first customer via the API.

In some embodiments, the one or more first network interconnection characteristics may be based on microservice data, wherein the microservice data may comprise at least one of: data regarding existence of partner validation between the call network service provider and the first entity service provider; data regarding lack of partner validation between the call network service provider and the first entity service provider; data regarding partner peering model attributes comprising at least one of one or more TN attributes, one or more fully qualified domain name ("FQDN") attributes, one or more trunk group ("TGRP") attributes, one or more X-Header attributes, or one or more user identification ("ID") attributes; data regarding existence of a public switch telephone network ("PSTN") provider route plan; data regarding lack of a PSTN provider route plan; data regarding existence of a first entity service provider route plan; data regarding lack of a first entity service provider route plan; data regarding existence of a PSTN provider rating; data regarding lack of a PSTN provider rating; data regarding existence of a rater of the first entity service provider; data regarding lack of a rater of the entity rater; data regarding telephone number ("TN") attributes comprising at least one of one or more TN digit attributes or one or more TN type attributes; data regarding existence of a redundancy model; data regarding lack of a redundancy model; or data regarding redundancy type attributes comprising at least one of one or more geographical attributes per region or overflow attributes; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing service provisioning, and, more particularly, to methods, systems, and apparatuses for implementing programmatical public switched telephone network ("PSTN") trunking for cloud hosted applications, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1A is a schematic diagram illustrating a system 100 for implementing programmatical public switched telephone network ("PSTN") trunking for cloud hosted applications, in accordance with various embodiments. In some embodiments, system 100 may comprise a computing system 105, a telephone number ("TN") and caller ID name ("CNAM") inventory system 110 (herein also referred to as "inventory system 110" or "database 110" or the like), and an application programming interface ("API") hub 115, each of which may be part of orchestration system 120. In some embodiments, the computing system 105 may comprise at least one of an orchestrator, a call service provisioning system, a provisioning flow system, a network provisioning application layer ("NPAL") system, a call controller, a call manager, a media gateway controller, a server, a video call server, an instant messaging server, a network operations center ("NOC"), a centralized provisioning system, or a distributed provisioning system, and/or the like.

System 100 may comprise NPAL 125, soft switch 130, and one or more first session border controllers ("SBCs") 135a-135n (collectively, "SBCs 135" or the like), each of which may be disposed within call network service provider network(s) 140. In some cases, orchestration system 120 (and its components) may also be disposed in network(s) 140. In some instances, computing system 105 and NPAL 125 may be integrated, while in other cases, computing system 105 and NPAL 125 may be separate devices that may be communicatively coupled to each other.

System 100 may further comprise one or more shared peering connections 145a-145n (collectively, "shared peering 145" or "shared peering connections 145" or the like) between corresponding one or more first SBCs 135 and corresponding one or more second SBCs 150a-150n (collectively, "SBCs 150" or the like) in first entity service provider network(s) 155. System 100 may further comprise one or more customer devices 175a-175c (collectively, "customer devices 175" or the like) associated with customers (each of which may be one of an individual, a group of individuals, a family, a corporate entity, a non-corporate company, or the like), the customer devices 175 being disposed within first entity service provider network(s) 155. The shared peering connections 145 enable two or more call connections from corresponding two or more customer devices 175 (e.g., such as shown in FIG. 1A by customer A device 175a and customer B device 175b each sending corresponding SIP invites via SBC 150a and SBC 135a via the single shared peering connection (in this case, shared peering connection 145a, or the like). Where the two or more call connections are concurrent, the shared peering connections 145 utilize multiplexing techniques to handle the multiple concurrent call connections over the single shared peering connection 145. System 100 may comprise one or more APIs 180 that communicatively couple one or more customer devices 175 with API hub 115. System 100 may further comprise billing system 170 and gateway or gateway device 185, each disposed within call network service provider network(s) 140. The gateway 185 may communicatively couple with a PSTN 190.

In operation, a computing system (e.g., computing system 105, or the like) may determine one or more first network interconnection characteristics associated with a first entity service provider within a call service network (e.g., call network service provider network(s) 140, or the like) operated by a call network service provider. Based on the determined one or more first network interconnection characteristics associated with the first entity service provider, the computing system may cause a NPAL (e.g., NPAL 125, or the like) to establish one or more network interconnections between a first network associated with the first entity service provider (e.g., first entity service provider network(s) 155, or the like) and the call service network, in some cases, by establishing shared peering connections (e.g., shared peering connections 145, or the like) between the first network and the call service network. The shared peering connections may enable a plurality of customers of the first entity service provider to establish call service connections that are shared over the shared peering connections.

According to some embodiments, the call service connections may enable session initiation protocol ("SIP")-based communication. In some cases, the SIP-based communication may include, without limitation, at least one of a voice over Internet Protocol ("VoIP") call, an IP-based video call, or an instant message over IP, and/or the like. Alternatively, or additionally, the call service connections may enable a PSTN-based communication. In some instances, the call service connections may be shared and multiplexed over the shared peering connections for two or more of the plurality of customers.

In some embodiments, establishing the shared peering connections may comprise building trunk groups between one or more first entity service provider SBCs (e.g., SBCs 150, or the like) disposed within the first network and one or more call network service provider SBCs (e.g., SBCs 135, or the like) disposed within the call service network.

According to some embodiments, based on the determined one or more first network interconnection characteristics associated with the first entity service provider, the computing system may perform at least one of a routing determination 160 or a rating determination 165. In some cases, the routing determination 160 may include determination of routing of call data over at least one of the first network, the call service network, or the shared peering connections, and/or the like. In some instances, the rating determination 165 may include determination of costs for establishing call service connections over the at least one of the first network, the call service network, or the shared peering connections, and/or the like.

In some embodiments, in response to receiving a service order from a first customer of the first entity service provider for a call service provided over the call service network operated by the call network service provider, the computing system may receive caller ID name ("CNAM") data from the first customer, may retrieve a first set of telephone numbers ("TNs") from an inventory system (e.g., inventory system 110, or the like), may assign the first set of TNs to the first customer, and may send the assigned first set of TNs to the first customer. In some cases, the computing system may provision TN-based peering between the call service network and one or more user devices associated with the first customer (e.g., customer A device 175a, or the like) within the first network via the shared peering connections. In some cases, receiving the CNAM data may comprise receiving CNAM data from the first customer via an API (e.g., API 180, or the like). In some instances, sending the assigned first set of TNs to the first customer may comprise sending the assigned first set of TNs to the first customer via the API.

In response to the first customer sending, using customer A device 175a, a SIP invite, a call may be established between the customer A device 175a and a destination device associated with a called party or destination party via PSTN 190, gateway 185, soft switch 130, SBCs 135a, shared peering connection 145a, and SBC 150a, in some cases, using routing determination 160.

According to some embodiments, the one or more first network interconnection characteristics may be based on microservice data. In some instances, the microservice data may include, but is not limited to, at least one of: data regarding existence of partner validation between the call network service provider and the first entity service provider; data regarding lack of partner validation between the call network service provider and the first entity service provider; data regarding partner peering model attributes comprising at least one of one or more TN attributes, one or more fully qualified domain name ("FQDN") attributes, one or more trunk group ("TGRP") attributes, one or more X-Header attributes, or one or more user identification ("ID") attributes; data regarding existence of a public switch telephone network ("PSTN") provider route plan; data regarding lack of a PSTN provider route plan; data regarding existence of a first entity service provider route plan; data regarding lack of a first entity service provider route plan; data regarding existence of a PSTN provider rating; data regarding lack of a PSTN provider rating; data regarding existence of a rater of the first entity service provider; data regarding lack of a rater of the entity rater; data regarding telephone number ("TN") attributes comprising at least one of one or more TN digit attributes or one or more TN type attributes; data regarding existence of a redundancy model; data regarding lack of a redundancy model; or data regarding redundancy type attributes comprising at least one of one or more geographical attributes per region or overflow attributes; and/or the like.

These and other functions of the system 100 (and its components) are described in greater detail below with respect to FIGS. 2-4.

Figure 1B:
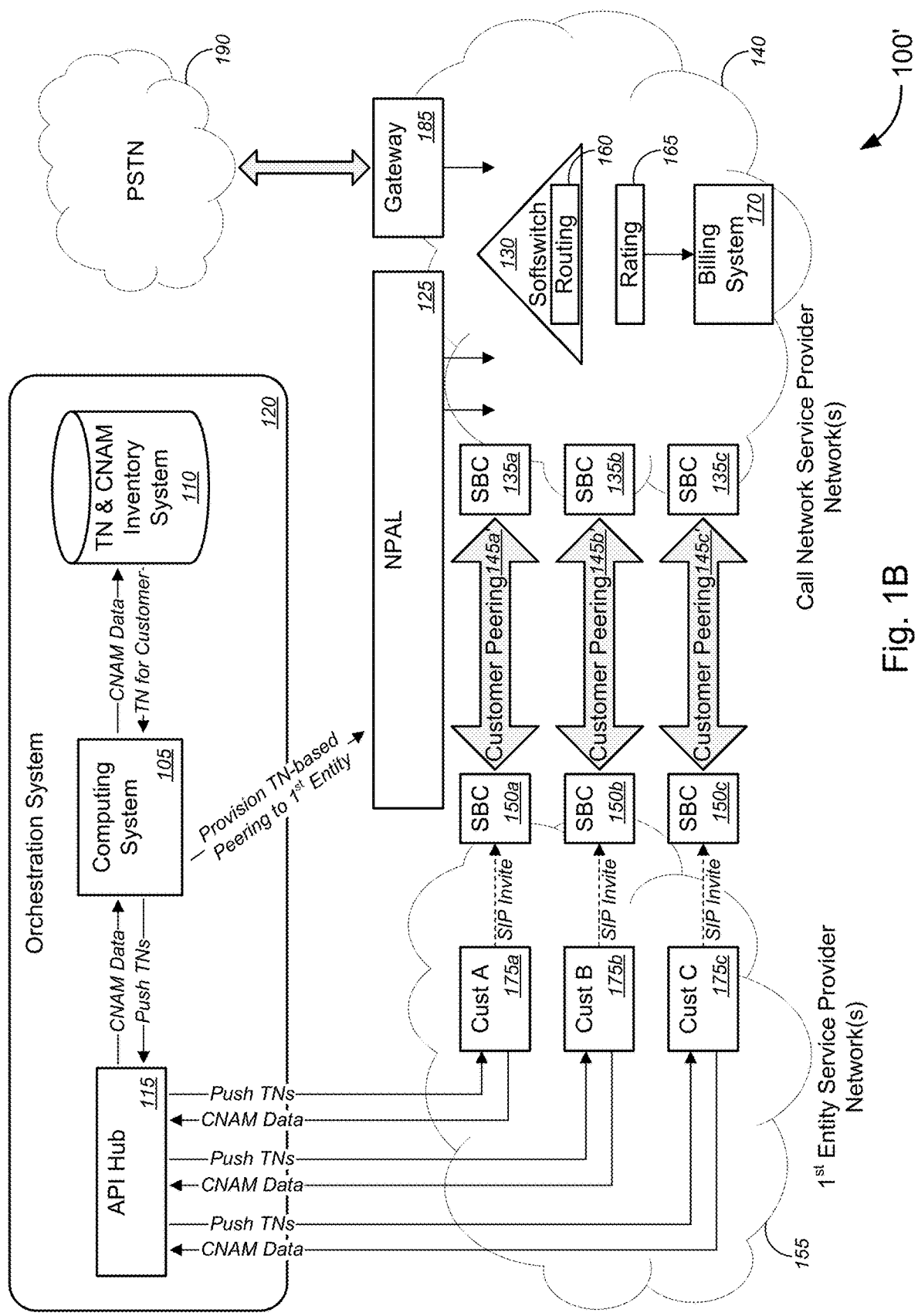
FIG. 1B is a schematic diagram illustrating a system for implementing customer-specific PSTN trunking for cloud hosted applications, in accordance with various embodiments.

FIG. 1B is a schematic diagram illustrating a system 100' for implementing customer-specific PSTN trunking for cloud hosted applications, in accordance with various embodiments. Unlike the programmatic PSTN trunking implementation of FIG. 1A, the customer-specific PSTN trunking implementation of FIG. 1B requires customer peering or customer-specific peering connections 145a'-145c' that may be established between corresponding sets of SBCs 150a-150c and SBCs 135a-135c to allow customer devices A-C 175a-175c, respectively. For example, a first customer peering connection 145a' may be established between SBC 150a disposed in network(s) 155 and SBC 135a disposed in network(s) 140 for enabling call connections between customer A device 175a (which is associated with a first customer, and which is disposed in network(s) 155) and PSTN 190 via gateway 185 in network(s) 140. Similarly, a second customer peering connection 145b' may be established between SBC 150b disposed in network(s) 155 and SBC 135b disposed in network(s) 140 for enabling call connections between customer B device 175b (which is associated with a second customer, and which is disposed in network(s) 155) and PSTN 190 via gateway 185 in network(s) 140. Likewise, a third customer peering connection 145c' may be established between SBC 150c disposed in network(s) 155 and SBC 135c disposed in network(s) 140 for enabling call connections between customer C device 175c (which is associated with a third customer, and which is disposed in network(s) 155) and PSTN 190 via gateway 185 in network(s) 140.

Although the customer-specific peering connections 145a'-145c' allow for dedicated peering connections to be established for call connections for each individual customer (and their customer device(s) 175), such customer-specific peering connections 145' are susceptible to peering connection failures that would negatively affect (in some cases, prevent) call services for the customer associated with the affected customer device 175. Further, from the service provider perspective, unused peering connections result in inefficient use of resources, in this case, peering connections between networks 155 and 140.

Figure 2A:
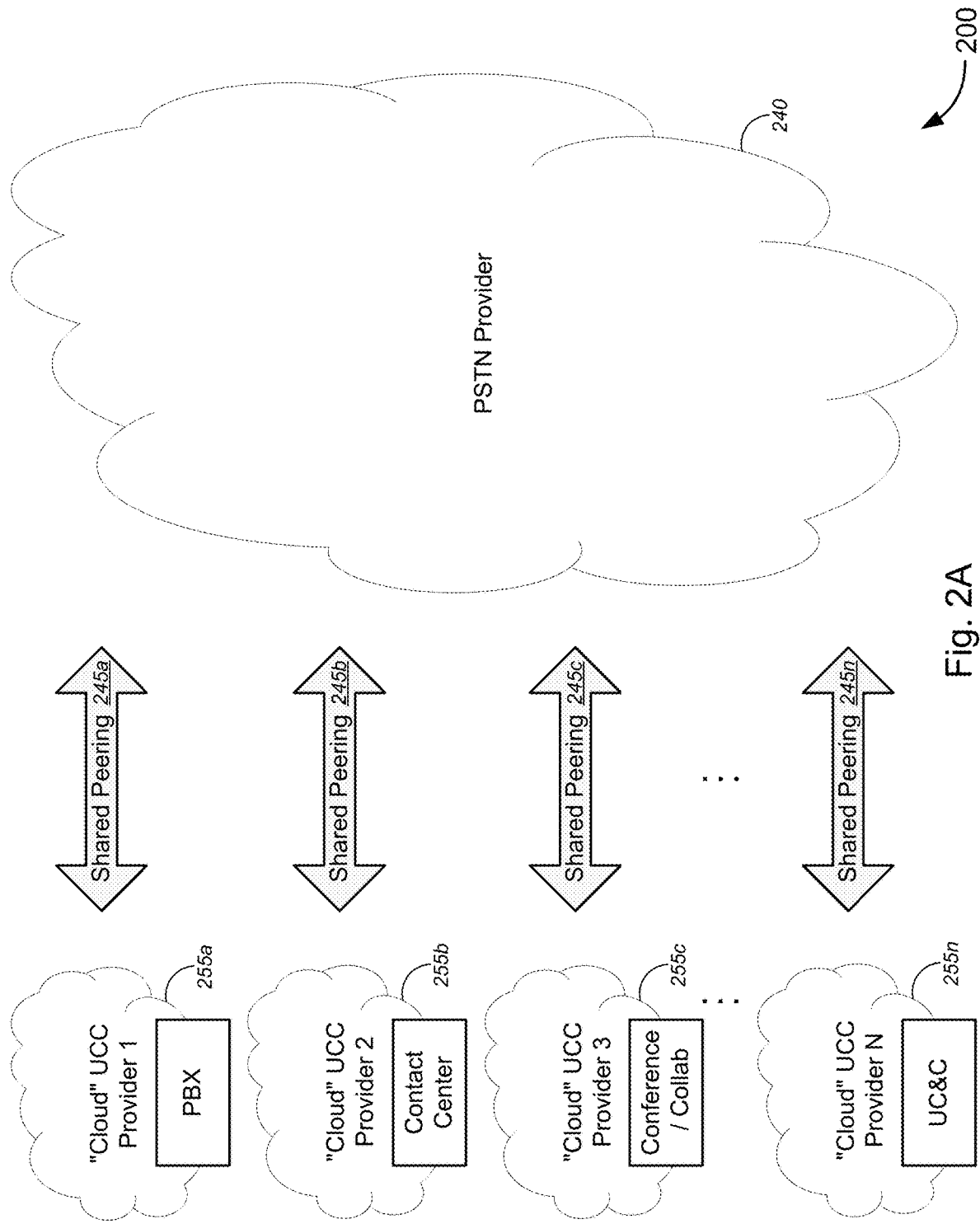
FIGS. 2A and 2B are schematic diagram illustrating various non-limiting examples of shared peering that may be utilized for a plurality of service providers when implementing programmatical PSTN trunking for cloud hosted applications, in accordance with various embodiments.
Figure 2B:
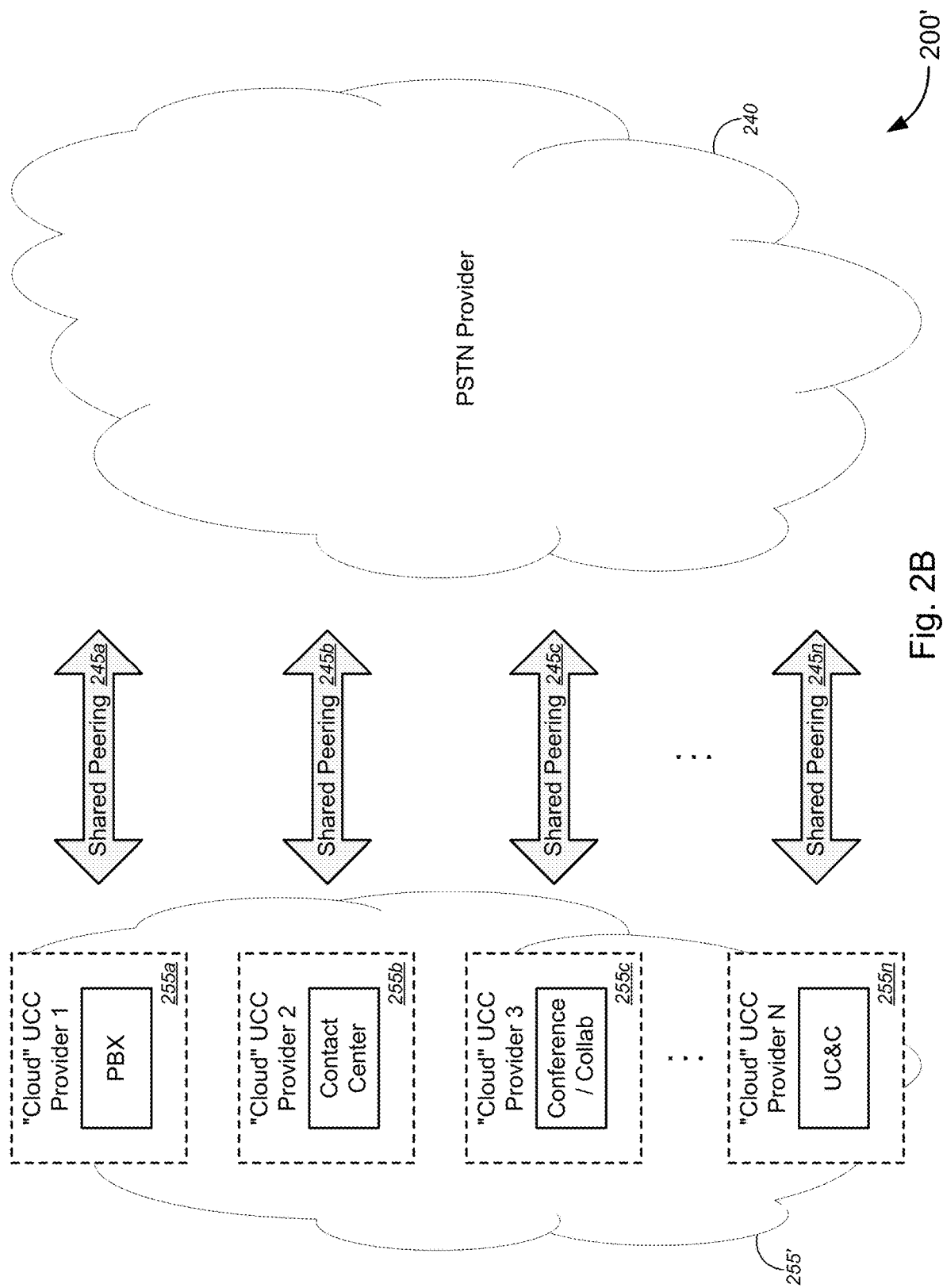

FIGS. 2A and 2B are schematic diagram illustrating various non-limiting examples 200 and 200' of shared peering that may be utilized for a plurality of service providers when implementing programmatical PSTN trunking for cloud hosted applications, in accordance with various embodiments.

With reference to the non-limiting embodiment 200 of FIG. 2A, a plurality of first through $N^{th}$ "cloud" unified communications and collaboration ("UCC") providers (i.e., their networks) 255a-255n (collectively, "UCC providers 255" or the like; similar to $1^{st}$ entity service provider network(s) 155 of FIG. 1, or the like) may communicatively couple with PSTN provider (i.e., its network(s)) 240 (similar to call network service provider network(s) 140 of FIG. 1, or the like) via sets of shared peering connections 245a-245n (collectively, "shared peering connections 245" or "peering connections 245" or the like; similar to shared peering connections 145a-145n of FIG. 1, or the like). That is, each set of shared peering connections 245 may include two or more shared peering connections between each provider or provider network 255 and the PSTN provider or PSTN provider network 240.

For example, although not shown in FIG. 2A, shared peering connection 245a may include two or more shared peering connections between the first cloud UCC provider 255a (in this case, providing private branch exchange ("PBX") service, or the like, to its customers (such as customers or customer devices 175a-175c of FIG. 1, or the like)) and the PSTN provider or PSTN provider network 240. Similarly, shared peering connection 245b may include two or more shared peering connections between the second cloud UCC provider 255b (in this case, providing contact center service or call center service, or the like, to its customers (such as customers or customer devices 175a-175c of FIG. 1, or the like)) and the PSTN provider or PSTN provider network 240. Likewise, shared peering connection 245c may include two or more shared peering connections between the third cloud UCC provider 255c (in this case, providing conference and/or collaboration service, or the like, to its customers (such as customers or customer devices 175a-175c of FIG. 1, or the like)) and the PSTN provider or PSTN provider network 240. In a similar manner, shared peering connection 245n may include two or more shared peering connections between the $N^{th}$ cloud UCC provider 255n (in this case, providing unified conference and collaboration or UCC service, or the like, to its customers (such as customers or customer devices 175a-175c of FIG. 1, or the like)) and the PSTN provider or PSTN provider network 240. Each of these services provided by the UCC providers 255 may require PSTN (in some cases, requiring telephone numbers and the ability to call out and/or to receive calls via telephone numbers, or the like). Although particular example services are provided above, the various embodiments are not limited to these particular example services, and any suitable services may be provided by the providers 255a-255n.

While example 200 of FIG. 2A depicts each provider 255 having its own network, and thus its own set of shared peering connections 245 with the PSTN provider 240 and its network(s), in some embodiments, such as shown in non-limiting example 200' of FIG. 2B, a plurality of providers 255a-255n may utilize the same network(s) 255' (such as in the case of local, regional, or national service providers utilizing networks that are owned and operated by a large regional, national, or international network service provider, or the like). These distinct provider entities 255, although having systems (and their customers or customers' devices) being disposed within or utilizing the same network(s) 255', may have different connection and service agreements with the PSTN provider 240, and thus may be charged differently to establish shared peering connections with the PSTN provider network.

According to some embodiments, each set of shared peering connections 245 may be established or built to accommodate call service connections for customers of one provider 255 (that is, one set of shared peering connections to share amongst the customers of one provider) [referred to herein as "provider set of shared peering connections"]. Alternatively, the pool of sets of shared peering connections may be established or built to accommodate call service connections for customers of two or more (or all) providers 255 (in some cases, enabling multiplexing for concurrent call connections, or the like) [referred to herein as "pooled set of shared peering connections amongst multiple providers"]. Alternatively, a combination of provider set of shared peering connections and pooled set of shared peering connections amongst multiple providers may be implemented, in some cases, based on agreements between particular providers 255 and the PSTN provider 240, with commensurate routing and rating based on corresponding routing determination and rating determination.

FIGS. 3A-3D (collectively, "FIG. 3") are schematic diagrams illustrating a non-limiting example 300 of changes to a system when implementing programmatical PSTN trunking for cloud hosted applications, in accordance with various embodiments. In FIG. 3, computing system 305, TN & CNAM inventory system 310, API hub 315, orchestration system 320, NPAL 325, soft switch 330, SBCs 335a-335n, call network service provider network(s) 340, shared peering connections 345a-345n, SBCs 350a-350n, first entity service provider network(s) 355, billing system 370, customer devices 375a-375c, API(s) 380, gateway device 385, and PSTN 390 may be similar, if not identical to corresponding computing system 105, TN & CNAM inventory system 110, API hub 115, orchestration system 120, NPAL 125, soft switch 130, SBCs 135a-135n, call network service provider network(s) 140, shared peering connections 145a-145n, SBCs 150a-150n, first entity service provider network(s) 155, billing system 170, customer devices 175a-175c, API(s) 180, gateway device 185, and PSTN 190, respectively, of FIG. 1. Accordingly, the descriptions of the components of FIG. 1 are similarly applicable to the corresponding components of FIG. 3.

Figure 3A:
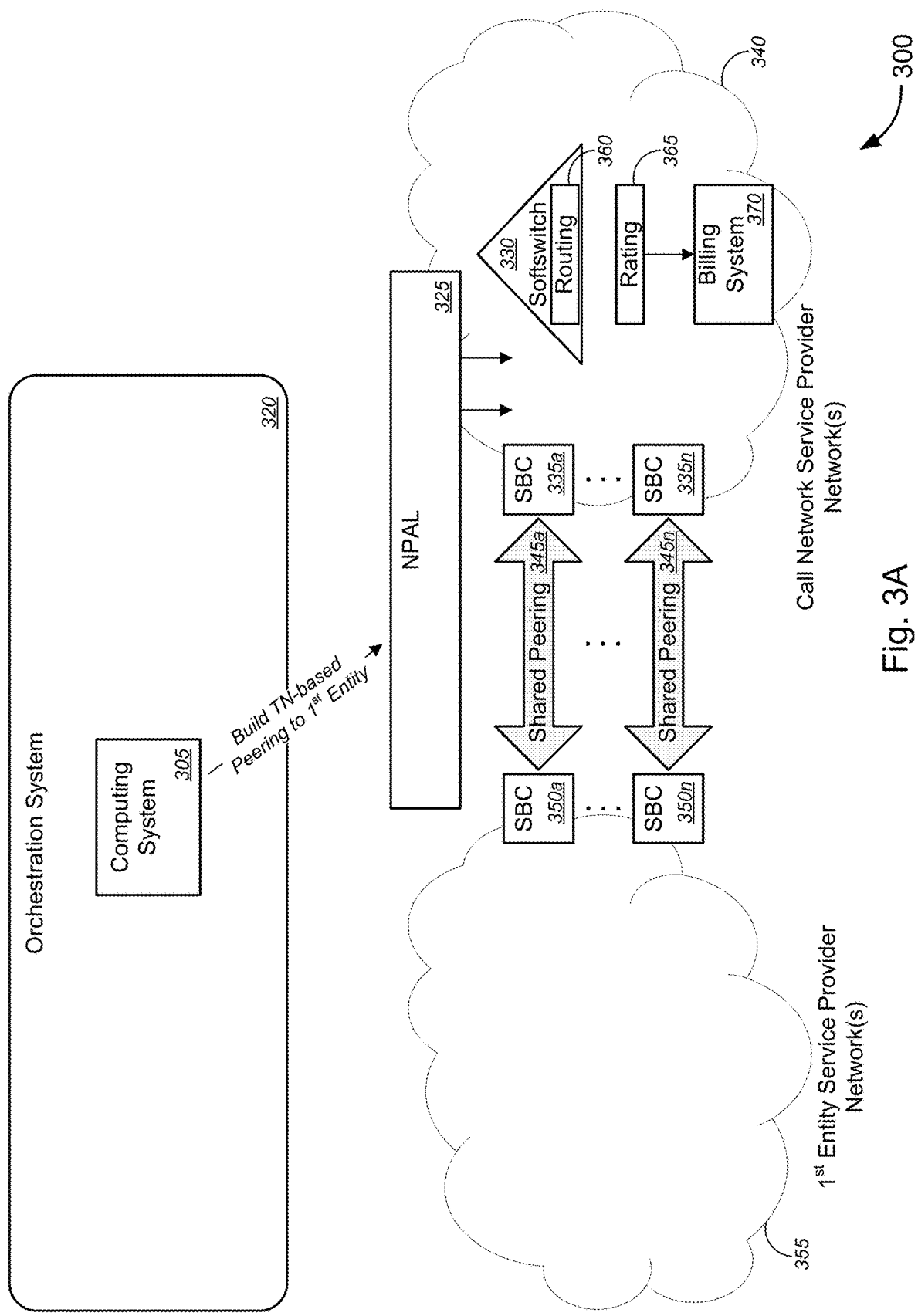
FIGS. 3A-3D are schematic diagrams illustrating a non-limiting example of changes to a system when implementing programmatical PSTN trunking for cloud hosted applications, in accordance with various embodiments.

Referring to FIG. 3A, a computing system (e.g., computing system 305, or the like) may determine one or more first network interconnection characteristics associated with a first entity service provider within a call service network (e.g., call network service provider network(s) 340, or the like) operated by a call network service provider. Based on the determined one or more first network interconnection characteristics associated with the first entity service provider, the computing system may cause a NPAL (e.g., NPAL 325, or the like) to establish one or more network interconnections between a first network associated with the first entity service provider (e.g., first entity service provider network(s) 355, or the like) and the call service network, in some cases, by establishing shared peering connections (e.g., shared peering connections 345, or the like) between the first network and the call service network. The shared peering connections may enable a plurality of customers of the first entity service provider to establish call service connections that are shared over the shared peering connections.

According to some embodiments, the call service connections may enable session initiation protocol ("SIP")-based communication. In some cases, the SIP-based communication may include, without limitation, at least one of a voice over Internet Protocol ("VoIP") call, an IP-based video call, or an instant message over IP, and/or the like. Alternatively, or additionally, the call service connections may enable a PSTN-based communication. In some instances, the call service connections may be shared and multiplexed over the shared peering connections for two or more of the plurality of customers.

In some embodiments, establishing the shared peering connections may comprise building trunk groups between one or more first entity service provider SBCs (e.g., SBCs 350, or the like) disposed within the first network and one or more call network service provider SBCs (e.g., SBCs 335, or the like) disposed within the call service network.

According to some embodiments, based on the determined one or more first network interconnection characteristics associated with the first entity service provider, the computing system may perform at least one of a routing determination 360 or a rating determination 365. In some cases, the routing determination 360 may include determination of routing of call data over at least one of the first network, the call service network, or the shared peering connections, and/or the like. In some instances, the rating determination 365 may include determination of costs for establishing call service connections over the at least one of the first network, the call service network, or the shared peering connections, and/or the like.

Figure 3B:
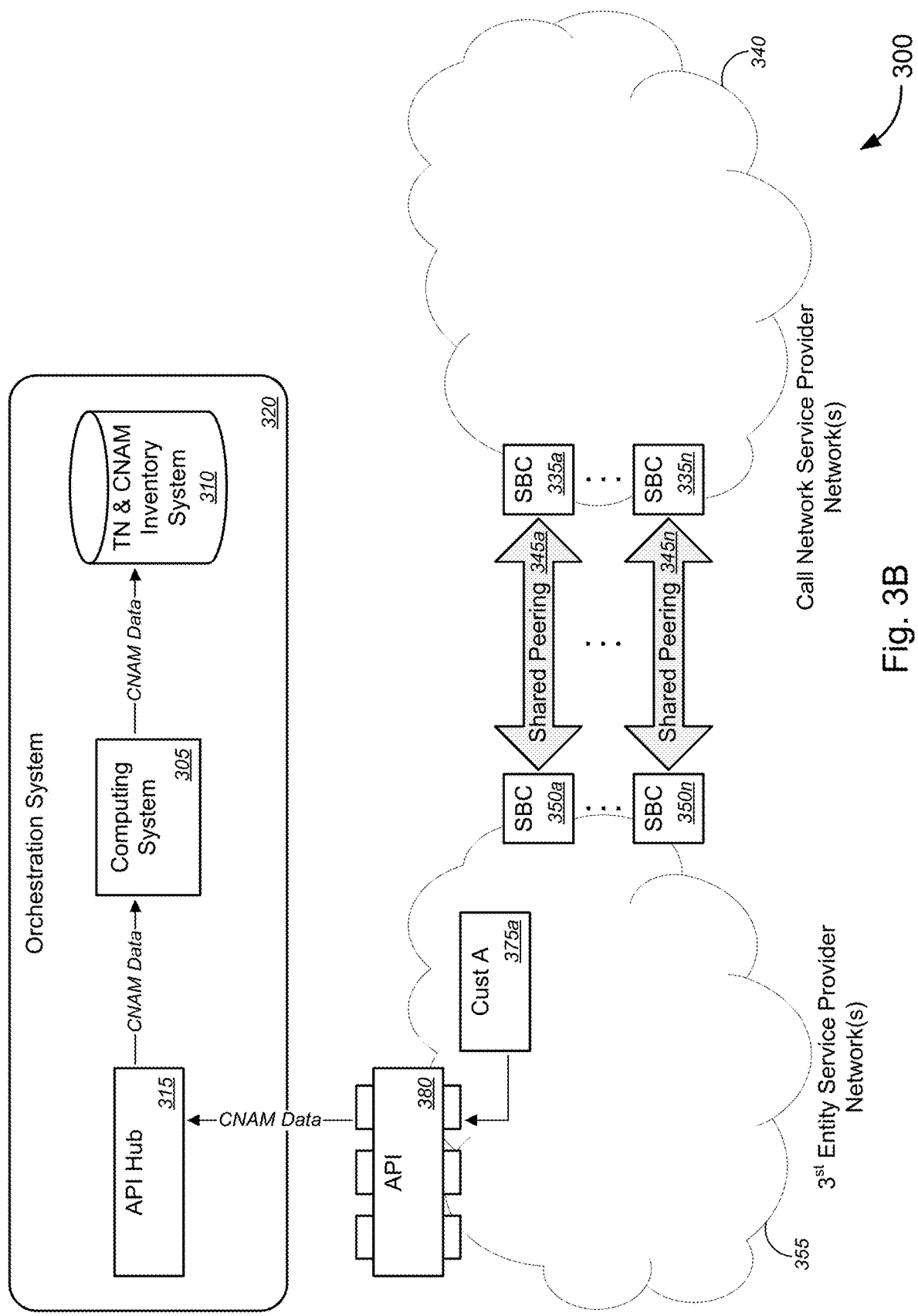

With reference to FIG. 3B, in response to receiving a service order from a first customer (which may be one of an individual, a group of individuals, a family, a corporate entity, a non-corporate company, or the like; e.g., customer A or customer A device 375a, or the like) of the first entity service provider for a call service provided over the call service network operated by the call network service provider, the computing system may receive CNAM data from the first customer, in some cases, via an API (e.g., API 380, or the like).

Figure 3C:
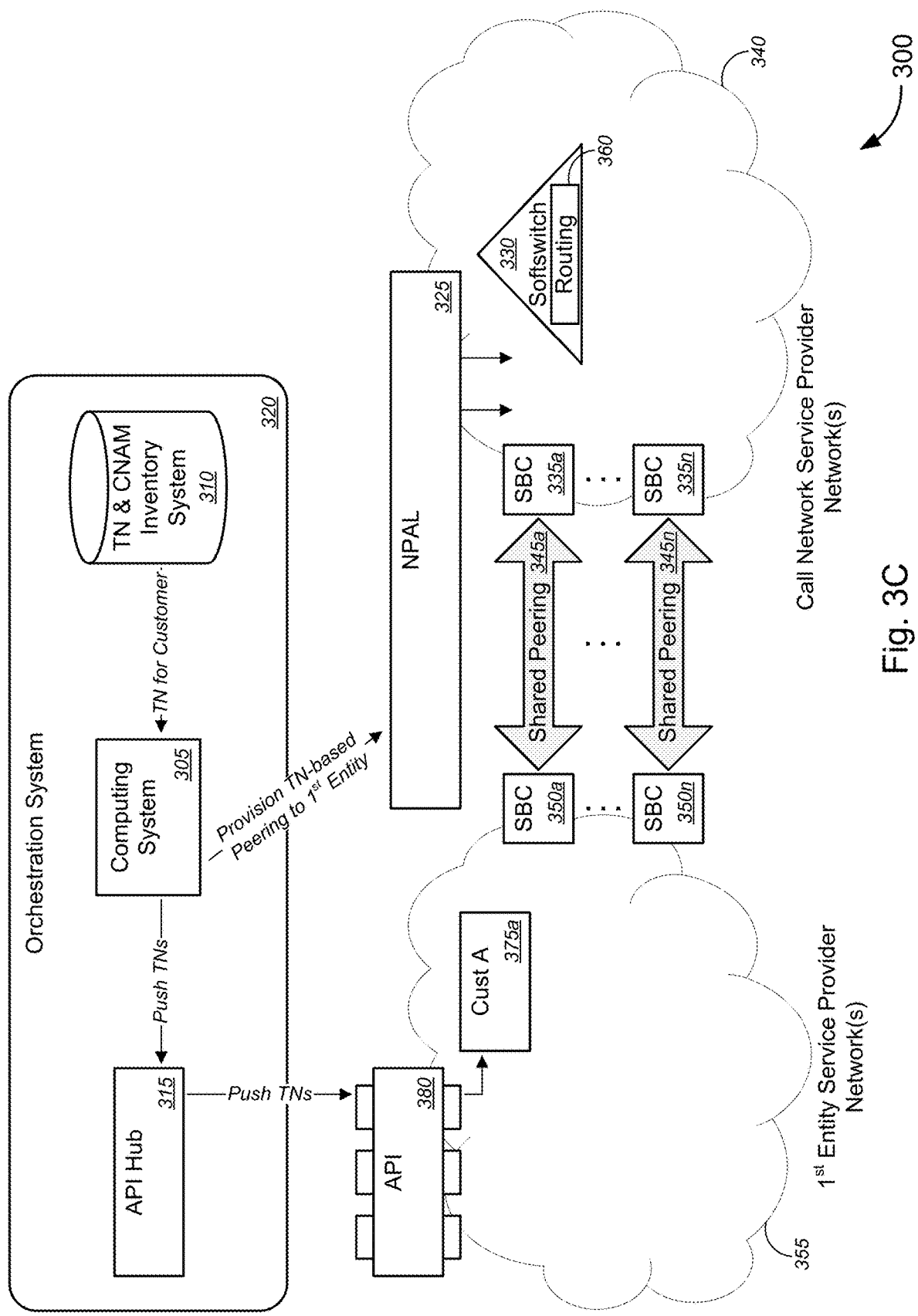

Referring to FIG. 3C, the computing system may retrieve a first set of TNs from an inventory system (e.g., inventory system 310, or the like), may assign the first set of TNs to the first customer, and may send the assigned first set of TNs to the first customer, in some cases, via the API.

Figure 3D:
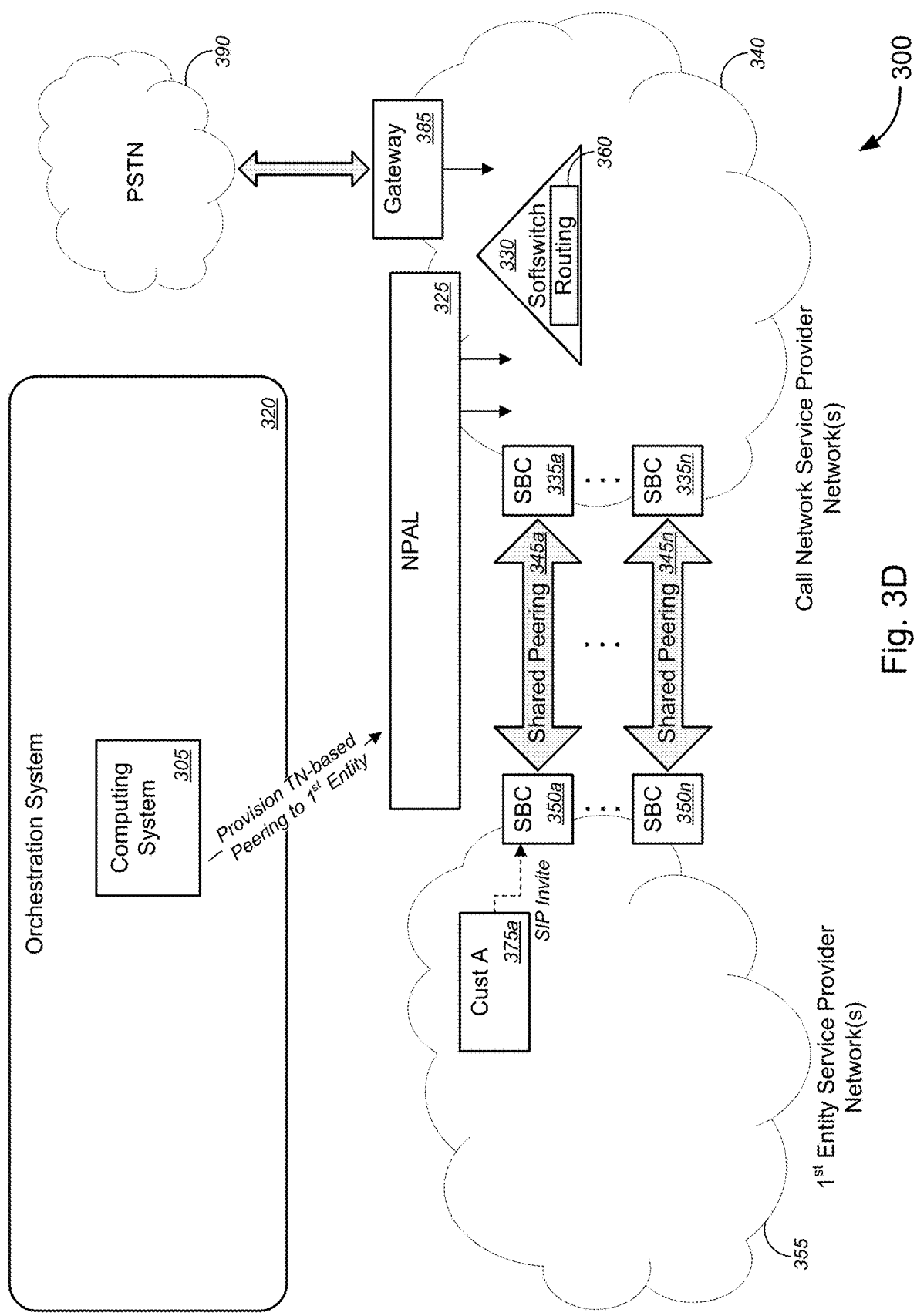

Turning to FIG. 3D, the computing system may provision TN-based peering between the call service network and one or more user devices associated with the first customer (e.g., customer A device 375a, or the like) within the first network via the shared peering connections. In response to the first customer sending, using customer A device 375a, a SIP invite, a call may be established between the customer A device 375a and a destination device associated with a called party or destination party via PSTN 390, gateway 385, soft switch 330, SBCs 335*a*, shared peering connection 345*a*, and SBC 350*a*, in some cases, using routing determination 360.

In some aspects, the programmatical PSTN trunking for cloud hosted applications may provide for one or more PSTN as a service ("PSTNaaS") models. The one or more PSTNaaS models may include, without limitation, at least one of a unified communications and collaboration ("UCC") PSTN enablement model, a PSTN only indirect Enterprise model, or a wholesale or hyperscaler targeted model, and/or the like.

In the UCC PSTN enablement model, a "child product" may be part of a sold UCC "parent product." For example, a customer may purchase at least one of a unified communications manager cloud ("UCMC") service, a phone service, or a contact center service, etc., from the call network service provider. The call network service provider may provide the PSTN, and may also possibly provide the transport (via network as a service ("NaaS"), or the like), as well as other complimentary services including, but not limited to, distributed denial of service ("DDoS") as a service ("DDoS-aaS"), infrastructure as a service ("IaaS"), virtual machine ("VM") as a service ("VMaaS"), business and mobility as a service ("BMaaS"), and/or secure access service edge ("SASE"), or the like. The call network service provider may "own" an Enterprise customer experience throughout a learn, buy, get, use, pay, and renew ("LBGUPR") flow.

In the PSTN-only indirect Enterprise model, the call network service provider may directly peer with third parties to permit the customers of those third parties to consume the PSTN service. This model may be envisioned by a third party as being a "choose the PSTN provider of one's choice as one procures the license" model. The call network service provider may "own" the PSTN contract, billing, and relationship, while the third party may "own" the customer's platform relationship. Traditionally (and poorly), this may be performed via business as usual ("BAU") SIP trunking products. In this model, the customer's LBGUPR flow may only pertain to PSTN services. A customer's experience may split between the third party and the call network service provider. For example, customers may be directed to a third party's portal to make changes to their third party-specific account settings, and may be directed to the call network service provider's portal to raise a ticket for PSTN moving average convergence divergence ("MACD"), troubles, etc.

In the wholesale or hyperscaler targeted model, the third party (e.g., Zoom, Amazon, etc.) may be the customer on record for the call network service provider. Typically, the third party may consume APIs of the call network service provider. The APIs may enable a digitized experience to consume the call network service provider's PSTN capabilities (e.g., direct inward dialing ("DID"), toll free ("TF"), short message service ("SMS"), etc.) in a wholesale manner such that the third parties can create products in the marketplace. Examples may include, but are not limited to, Zoom Native or Amazon Contact Center, or the like.

FIGS. 4A-4D (collectively, "FIG. 4") are flow diagrams illustrating a method 400 for implementing programmatical PSTN trunking for cloud hosted applications, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', and 300 of FIGS. 1A, 2A, 2B, and 3A-3D, respectively (or components thereof), such methods may also be implemented using any suitable hardware (or software) implementation. Similarly, while each of the systems, examples, or embodiments 100, 200, 200', and 300 of FIGS. 1A, 2A, 2B, and 3A-3D, respectively (or components thereof), can operate according to the method 400 illustrated by FIG. 4 (e.g., by executing instructions embodied on a computer readable medium), the systems, examples, or embodiments 100, 200, 200', and 300 of FIGS. 1A, 2A, 2B, and 3A-3D can each also operate according to other modes of operation and/or perform other suitable procedures.

Figure 4A:
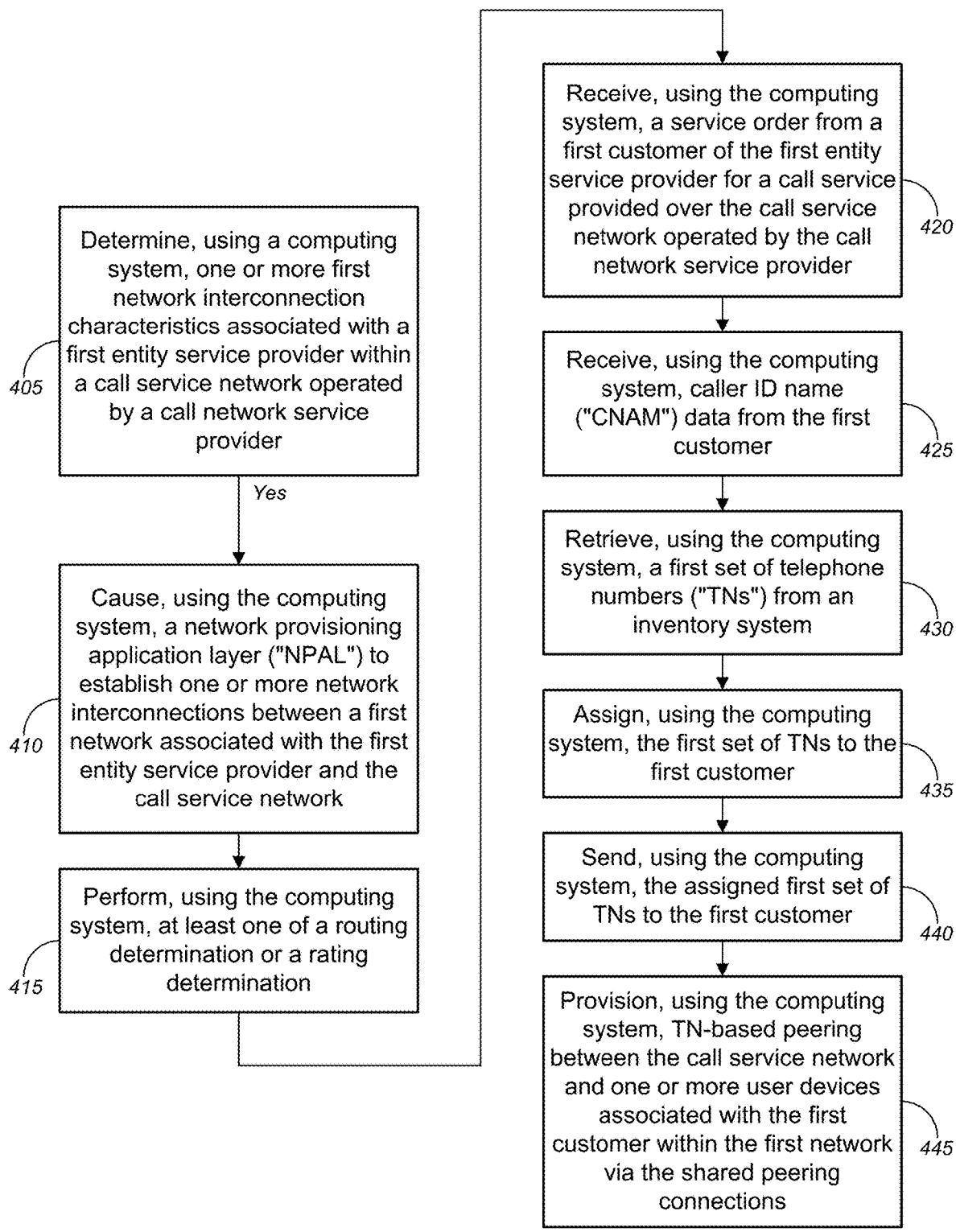

In the non-limiting embodiment of FIG. 4A, method 400, at block 405, may comprise determining, using a computing system, one or more first network interconnection characteristics associated with a first entity service provider within a call service network operated by a call network service provider. In some embodiments, the computing system may comprise at least one of an orchestrator, a call service provisioning system, a provisioning flow system, a NPAL system, a call controller, a call manager, a media gateway controller, a server, a video call server, an instant messaging server, a network operations center ("NOC"), a centralized provisioning system, or a distributed provisioning system, and/or the like.

Method 400 may further comprise, at block 410, based on the determined one or more first network interconnection characteristics associated with the first entity service provider, causing, using the computing system, a network provisioning application layer ("NPAL") to establish one or more network interconnections between a first network associated with the first entity service provider and the call service network. At block 415, method 400 may comprise performing, using the computing system, at least one of a routing determination or a rating determination. In some cases, the routing determination may comprise determination of routing of call data over at least one of the first network, the call service network, or the shared peering connections, and/or the like. In some instances, the rating determination may comprise determination of costs for establishing call service connections over the at least one of the first network, the call service network, or the shared peering connections, and/or the like.

At block 420, method 400 may comprise receiving a service order from a first customer of the first entity service provider for a call service provided over the call service network operated by the call network service provider. In response to receiving a service order from a first customer of the first entity service provider for a call service provided over the call service network operated by the call network service provider, method 400 may comprise: receiving, using the computing system, caller ID name ("CNAM") data from the first customer (block 425); retrieving, using the computing system, a first set of telephone numbers ("TNs") from an inventory system (block 430); assigning, using the computing system, the first set of TNs to the first customer (block 435); and sending, using the computing system, the assigned first set of TNs to the first customer (block 440). Method 400, at block 445, may comprise provisioning, using the computing system, TN-based peering between the call service network and one or more user devices associated with the first customer within the first network via the shared peering connections.

Figure 4B:
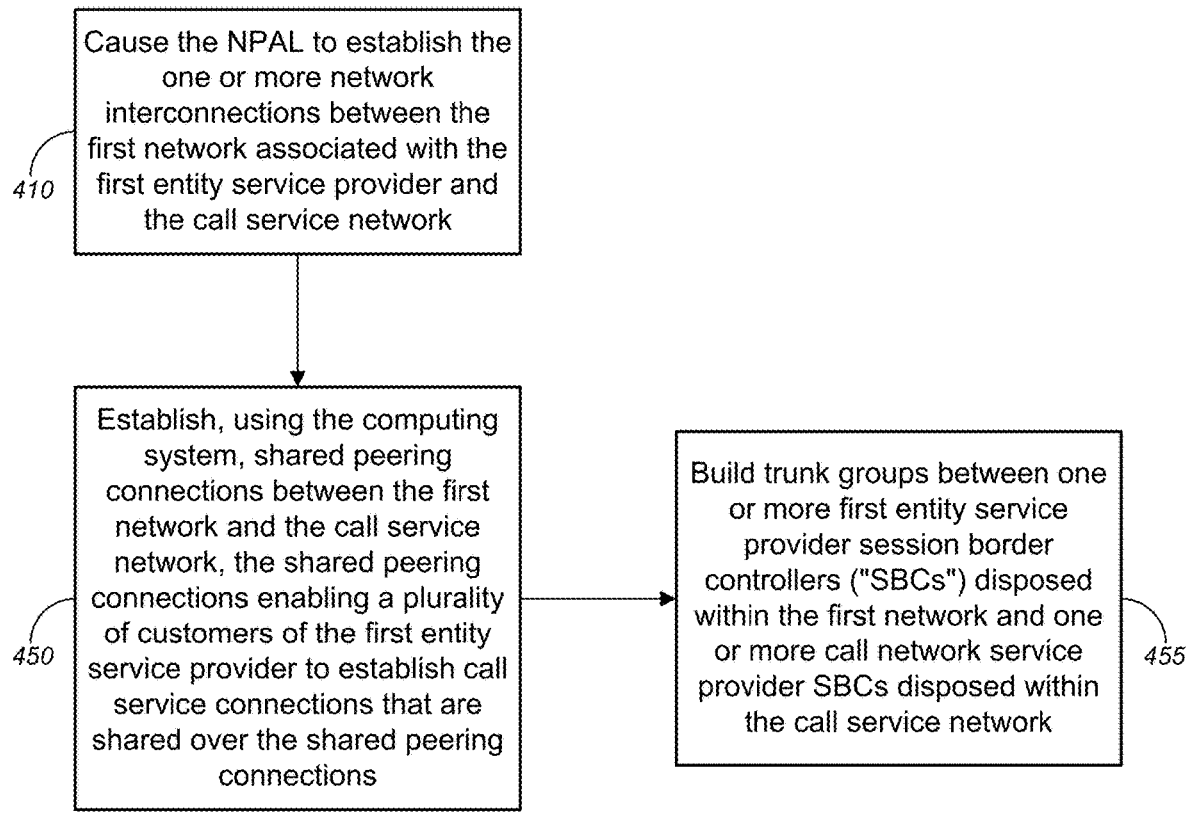

With reference to FIG. 4B, causing the NPAL to establish one or more network interconnections between the first network associated with the first entity service provider and the call service network (at block 410) may comprise establishing, using the computing system, shared peering connections between the first network and the call service network, the shared peering connections enabling a plurality of customers of the first entity service provider to establish call service connections that are shared over the shared peering connections (block 450). In some instances, establishing the shared peering connections (at block 450) may comprise building trunk groups between one or more first entity service provider session border controllers ("SBCs") disposed within the first network and one or more call network service provider SBCs disposed within the call service network (block 455).

According to some embodiments, the call service connections may enable session initiation protocol ("SIP")-based communication. In some cases, the SIP-based communication may comprise at least one of a voice over Internet Protocol ("VoIP") call, an IP-based video call, or an instant message over IP, and/or the like. Alternatively, or additionally, the call service connections may enable a public switch telephone network ("PSTN")-based communication. In some instances, the call service connections may be shared and multiplexed over the shared peering connections for two or more of the plurality of customers.

In some embodiments, establishing the shared peering connections may comprise building trunk groups between one or more first entity service provider session border controllers ("SBCs") disposed within the first network and one or more call network service provider SBCs disposed within the call service network.

Referring to FIG. 4C, receiving the CNAM data (at block 425) may comprise receiving, using the computing system, CNAM data from the first customer via an application programming interface ("API") (block 460).

Turning to FIG. 4D, sending the assigned first set of TNs to the first customer (at block 440) may comprise sending, using the computing system, the assigned first set of TNs to the first customer via the API (block 465).

Merely by way of example, in some cases, the one or more first network interconnection characteristics may be based on microservice data. In some instances, the microservice data may comprise at least one of: data regarding existence of partner validation between the call network service provider and the first entity service provider; data regarding lack of partner validation between the call network service provider and the first entity service provider; data regarding partner peering model attributes comprising at least one of one or more TN attributes, one or more fully qualified domain name ("FQDN") attributes, one or more trunk group ("TGRP") attributes, one or more X-Header attributes, or one or more user identification ("ID") attributes; data regarding existence of a public switch telephone network ("PSTN") provider route plan; data regarding lack of a PSTN provider route plan; data regarding existence of a first entity service provider route plan; data regarding lack of a first entity service provider route plan; data regarding existence of a PSTN provider rating; data regarding lack of a PSTN provider rating; data regarding existence of a rater of the first entity service provider; data regarding lack of a rater of the entity rater; data regarding telephone number ("TN") attributes comprising at least one of one or more TN digit attributes or one or more TN type attributes; data regarding existence of a redundancy model; data regarding lack of a redundancy model; or data regarding redundancy type attributes comprising at least one of one or more geographical attributes per region or overflow attributes; and/or the like.

Exemplary System and Hardware Implementation

Figure 5:
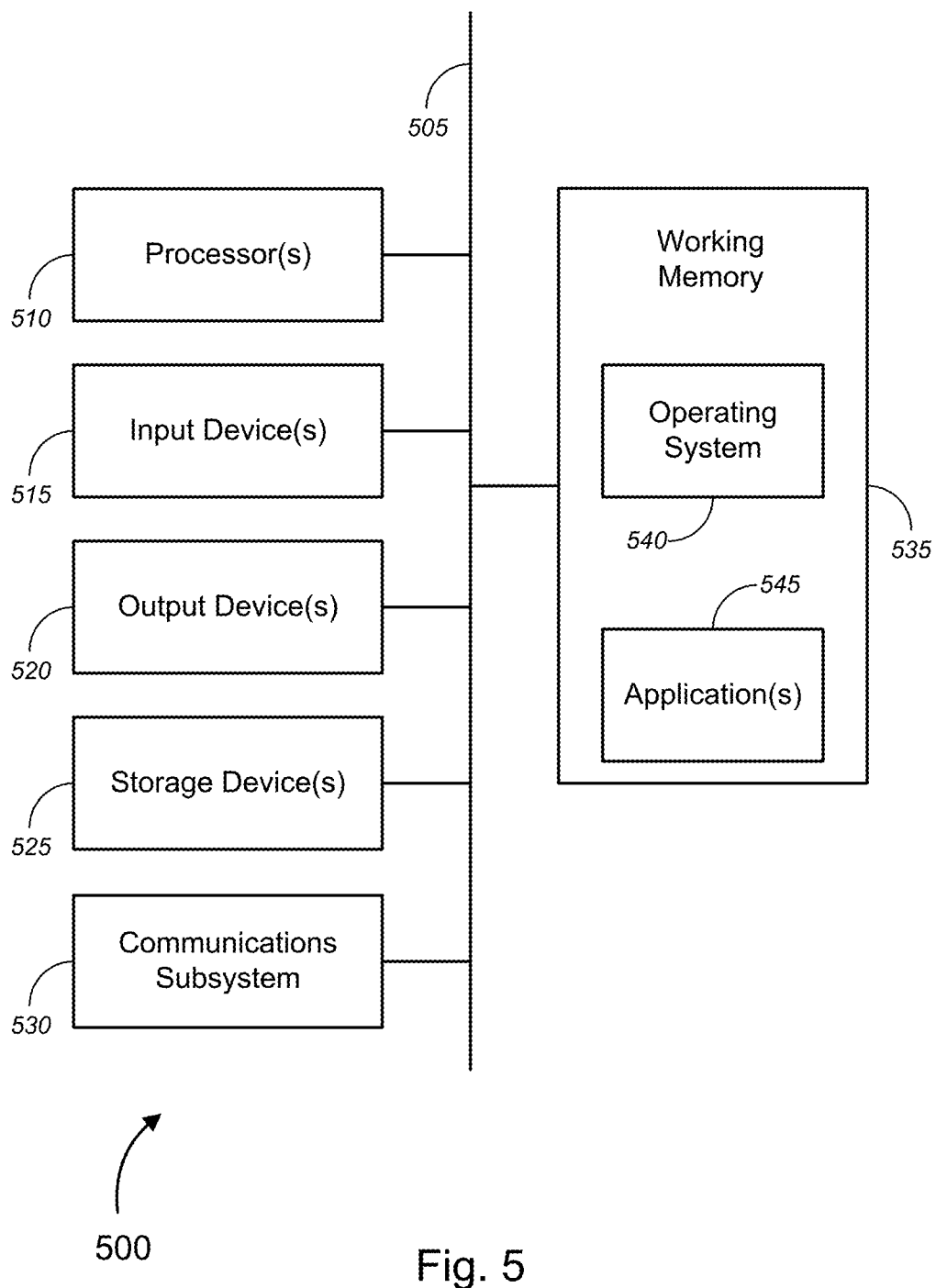
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105 and 305, application programming interface ("API") hubs 115 and 315, orchestration systems 120 and 320, soft switches 130 and 230, session border controllers ("SBCs") 135a-135n, 150a-150n, 235a-235n, and 250a-250n, billing systems 170 and 270, customer devices 175a-175c and 375a-375n, and gateway devices 185 and 385, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105 and 305, API hubs 115 and 315, orchestration systems 120 and 320, soft switches 130 and 230, SBCs 135a-135n, 150a-150n, 235a-235n, and 250a-250n, billing systems 170 and 270, customer devices 175a-175c and 375a-375n, and gateway devices 185 and 385, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
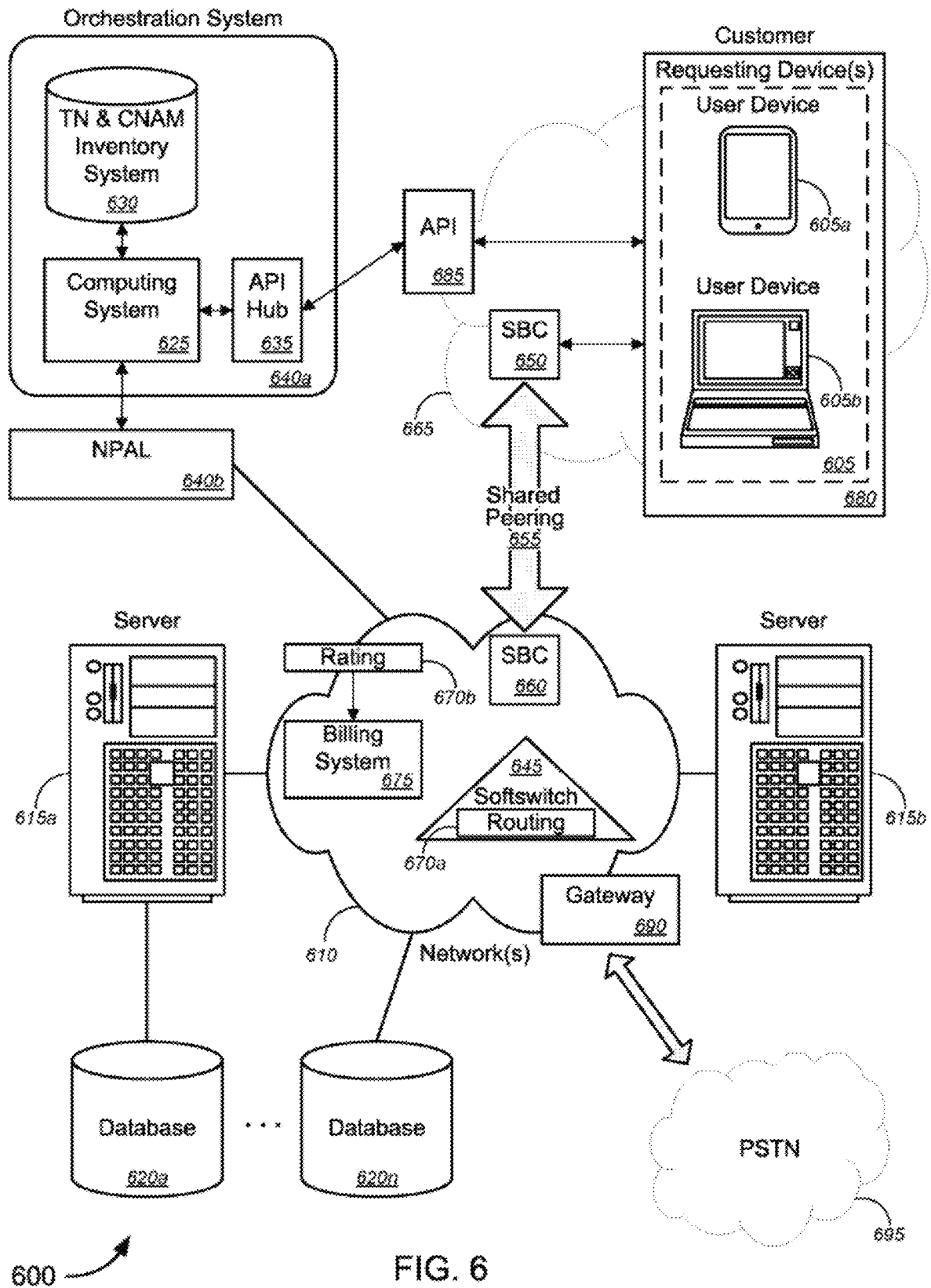
FIG. 6 is a block diagram illustrating a networked system of computers, computing systems, or system hardware architecture, which can be used in accordance with various embodiments.

As noted above, a set of embodiments comprises methods and systems for implementing service provisioning, and, more particularly, to methods, systems, and apparatuses for implementing programmatical public switched telephone network ("PSTN") trunking for cloud hosted applications. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to networks 140, 155, and 190 of FIG. 1 and networks 340, 355, and 390 of FIG. 3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing service provisioning, and, more particularly, to methods, systems, and apparatuses for implementing programmatical PSTN trunking for cloud hosted applications, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise computing system 625 (similar to computing systems 105 and 305 of FIGS. 1A and 3, or the like), TN & CNAM inventory system 630 (similar to TN & CNAM inventory system 110 and 310 of FIGS. 1A and 3, or the like), API hub 635 (similar to API hubs 115 and 315 of FIGS. 1A and 3, or the like), orchestration system 640a (similar to orchestration systems 120 and 320 of FIGS. 1A and 3, or the like), NPAL 640b (similar to NPALs 125 and 325 of FIGS. 1A and 3, or the like), soft switch 645 (similar to soft switches 130 and 330 of FIGS. 1A and 3, or the like), SBC 660 (similar to SBCs 135a-135n and 335a-335n of FIGS. 1A and 3, or the like), shared peering connections 655 (similar to shared peering connections 145a-145n and 345a-345n of FIGS. 1A and 3, or the like), SBC 650 (similar to SBCs 150a-150n and 350a-350n of FIGS. 1A and 3, or the like), network(s) 665 (similar to first entity service provider networks 155 and 355 of FIGS. 1A and 3, or the like), billing system 675 (similar to billing systems 170 and 370 of FIGS. 1A and 3, or the like), API(s) 685 (similar to APIs 180 and 380 of FIGS. 1A and 3, or the like), gateway device 690 (similar to gateway devices and 185 and 385 of FIGS. 1A and 3, or the like), and PSTN 695 (similar to PSTNs 190 and 390 of FIGS. 1A and 3, or the like). In some cases, soft switch 645, SBC 660, billing system 675, and gateway 690 may be disposed within network(s) 610 (similar to call network service provider networks 140 and 340 of FIGS. 1A and 3, or the like).

In operation, a computing system (e.g., computing system 625, or the like) may determine one or more first network interconnection characteristics associated with a first entity service provider within a call service network (e.g., network(s) 610, or the like) operated by a call network service provider. Based on the determined one or more first network interconnection characteristics associated with the first entity service provider, the computing system may cause a NPAL (e.g., NPAL 640b, or the like) to establish one or more network interconnections between a first network associated with the first entity service provider (e.g., first entity service provider network(s) 665, or the like) and the call service network, in some cases, by establishing shared peering connections (e.g., shared peering connections 655, or the like) between the first network and the call service network. The shared peering connections may enable a plurality of customers of the first entity service provider to establish call service connections that are shared over the shared peering connections.

According to some embodiments, the call service connections may enable session initiation protocol ("SIP")-based communication. In some cases, the SIP-based communication may include, without limitation, at least one of a voice over Internet Protocol ("VoIP") call, an IP-based video call, or an instant message over IP, and/or the like. Alternatively, or additionally, the call service connections may enable a PSTN-based communication. In some instances, the call service connections may be shared and multiplexed over the shared peering connections for two or more of the plurality of customers.

In some embodiments, establishing the shared peering connections may comprise building trunk groups between one or more first entity service provider SBCs (e.g., SBCs 650, or the like) disposed within the first network and one or more call network service provider SBCs (e.g., SBCs 660, or the like) disposed within the call service network.

According to some embodiments, based on the determined one or more first network interconnection characteristics associated with the first entity service provider, the computing system may perform at least one of a routing determination 670a or a rating determination 670b. In some cases, the routing determination 670a may include determination of routing of call data over at least one of the first network, the call service network, or the shared peering connections, and/or the like. In some instances, the rating determination 670b may include determination of costs for establishing call service connections over the at least one of the first network, the call service network, or the shared peering connections, and/or the like.

In some embodiments, in response to receiving a service order from a first customer of the first entity service provider for a call service provided over the call service network operated by the call network service provider, the computing system may receive caller ID name ("CNAM") data from the first customer, may retrieve a first set of telephone numbers ("TNs") from an inventory system (e.g., inventory system 630, or the like), may assign the first set of TNs to the first customer, and may send the assigned first set of TNs to the first customer. In some cases, the computing system may provision TN-based peering between the call service network and one or more user devices associated with the first customer 680 (or customer device 605a or 605b, or the like) within the first network via the shared peering connections. In some cases, receiving the CNAM data may comprise receiving CNAM data from the first customer via an API (e.g., API 685, or the like). In some instances, sending the assigned first set of TNs to the first customer may comprise sending the assigned first set of TNs to the first customer via the API.

In response to the first customer sending, using customer device 605a or 605b, a SIP invite, a call may be established between the customer device 605a or 605b and a destination device associated with a called party or destination party via PSTN 695, gateway 690, soft switch 645, SBC 660, shared peering connection 655, and SBC 650, in some cases, using routing determination 670a.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    determining, using a computing system, one or more first network interconnection characteristics associated with a first entity service provider within a call service network operated by a call network service provider; and
    based on the determined one or more first network interconnection characteristics associated with the first entity service provider, causing, using the computing system, a network provisioning application layer ("NPAL") to establish one or more network interconnections between a first network associated with the first entity service provider and the call service network, by establishing, using the computing system, shared peering connections between the first network and the call service network, the shared peering connections enabling a plurality of customers of the first entity service provider to establish call service connections that are shared over the shared peering connections,
    wherein establishing the shared peering connections comprises building trunk groups between one or more first entity service provider session border controllers ("SBCs") disposed within the first network and one or more call network service provider SBCs disposed within the call service network.

2. The method of claim 1, wherein the computing system comprises at least one of an orchestrator, a call service provisioning system, a provisioning flow system, a NPAL system, a call controller, a call manager, a media gateway controller, a server, a video call server, an instant messaging server, a network operations center ("NOC"), a centralized provisioning system, or a distributed provisioning system.

3. The method of claim 1, wherein the call service connections enable session initiation protocol ("SIP")-based communication, wherein the SIP-based communication comprises at least one of a voice over Internet Protocol ("VoIP") call, an IP-based video call, or an instant message over IP.

4. The method of claim 1, wherein the call service connections enable a public switch telephone network ("PSTN")-based communication.

5. The method of claim 1, wherein the call service connections are shared and multiplexed over the shared peering connections for two or more of the plurality of customers.

6. The method of claim 1, further comprising:
    based on the determined one or more first network interconnection characteristics associated with the first entity service provider, performing, using the computing system, at least one of a routing determination or a rating determination, wherein the routing determination comprises determination of routing of call data over at least one of the first network, the call service network, or the shared peering connections, wherein the rating determination comprises determination of costs for establishing call service connections over the at least one of the first network, the call service network, or the shared peering connections.

7. The method of claim 1, further comprising:
    in response to receiving a service order from a first customer of the first entity service provider for a call service provided over the call service network operated by the call network service provider, receiving, using the computing system, caller ID name ("CNAM") data from the first customer; retrieving, using the computing system, a first set of telephone numbers ("TNs") from an inventory system; assigning, using the computing system, the first set of TNs to the first customer; and sending, using the computing system, the assigned first set of TNs to the first customer; and
    provisioning, using the computing system, TN-based peering between the call service network and one or more user devices associated with the first customer within the first network via the shared peering connections.

8. The method of claim 7, wherein receiving the CNAM data comprises receiving, using the computing system, CNAM data from the first customer via an application programming interface ("API"), wherein sending the assigned first set of TNs to the first customer comprises sending, using the computing system, the assigned first set of TNs to the first customer via the API.

9. The method of claim 1, wherein the one or more first network interconnection characteristics are based on microservice data, wherein the microservice data comprises at least one of:
    data regarding existence of partner validation between the call network service provider and the first entity service provider;
    data regarding lack of partner validation between the call network service provider and the first entity service provider;
    data regarding partner peering model attributes comprising at least one of one or more TN attributes, one or more fully qualified domain name ("FQDN") attributes, one or more trunk group ("TGRP") attributes, one or more X-Header attributes, or one or more user identification ("ID") attributes;
    data regarding existence of a public switch telephone network ("PSTN") provider route plan;
    data regarding lack of a PSTN provider route plan;
    data regarding existence of a first entity service provider route plan;
    data regarding lack of a first entity service provider route plan;

data regarding existence of a PSTN provider rating;
data regarding lack of a PSTN provider rating;
data regarding existence of a rater of the first entity service provider;
data regarding lack of a rater of the entity rater;
data regarding telephone number ("TN") attributes comprising at least one of one or more TN digit attributes or one or more TN type attributes;
data regarding existence of a redundancy model;
data regarding lack of a redundancy model; or
data regarding redundancy type attributes comprising at least one of one or more geographical attributes per region or overflow attributes.

10. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
determine one or more first network interconnection characteristics associated with a first entity service provider within a call service network operated by a call network service provider; and
based on the determined one or more first network interconnection characteristics associated with the first entity service provider, cause a network provisioning application layer ("NPAL") to establish one or more network interconnections between a first network associated with the first entity service provider and the call service network, by establishing shared peering connections between the first network and the call service network, the shared peering connections enabling a plurality of customers of the first entity service provider to establish call service connections that are shared over the shared peering connections,
wherein establishing the shared peering connections comprises building trunk groups between one or more first entity service provider session border controllers ("SBCs") disposed within the first network and one or more call network service provider SBCs disposed within the call service network.

11. A system, comprising:
a computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the computing system to:
determine one or more first network interconnection characteristics associated with a first entity service provider within a call service network operated by a call network service provider; and
based on the determined one or more first network interconnection characteristics associated with the first entity service provider, cause a network provisioning application layer ("NPAL") to establish one or more network interconnections between a first network associated with the first entity service provider and the call service network, by establishing shared peering connections between the first network and the call service network, the shared peering connections enabling a plurality of customers of the first entity service provider to establish call service connections that are shared over the shared peering connections,
wherein establishing the shared peering connections comprises building trunk groups between one or more first entity service provider session border controllers ("SBCs") disposed within the first network and one or more call network service provider SBCs disposed within the call service network.

12. The system of claim 11, wherein the computing system comprises at least one of an orchestrator, a call service provisioning system, a provisioning flow system, a NPAL system, a call controller, a call manager, a media gateway controller, a server, a video call server, an instant messaging server, a network operations center ("NOC"), a centralized provisioning system, or a distributed provisioning system.

13. The system of claim 11, wherein the call service connections enable session initiation protocol ("SIP")-based communication, wherein the SIP-based communication comprises at least one of a voice over Internet Protocol ("VoIP") call, an IP-based video call, or an instant message over IP.

14. The system of claim 11, wherein the call service connections enable a public switch telephone network ("PSTN")-based communication.

15. The system of claim 11, wherein the call service connections are shared and multiplexed over the shared peering connections for two or more of the plurality of customers.

16. The system of claim 11, wherein the first set of instructions, when executed by the at least one first processor, further causes the computing system to:
based on the determined one or more first network interconnection characteristics associated with the first entity service provider, perform at least one of a routing determination or a rating determination, wherein the routing determination comprises determination of routing of call data over at least one of the first network, the call service network, or the shared peering connections, wherein the rating determination comprises determination of costs for establishing call service connections over the at least one of the first network, the call service network, or the shared peering connections.

17. The system of claim 11, wherein the first set of instructions, when executed by the at least one first processor, further causes the computing system to:
in response to receiving a service order from a first customer of the first entity service provider for a call service provided over the call service network operated by the call network service provider, receive caller ID name ("CNAM") data from the first customer; retrieve a first set of telephone numbers ("TNs") from an inventory system; assign the first set of TNs to the first customer; and send the assigned first set of TNs to the first customer; and
provision TN-based peering between the call service network and one or more user devices associated with the first customer within the first network via the shared peering connections.

18. The system of claim 17, wherein receiving the CNAM data comprises receiving CNAM data from the first customer via an application programming interface ("API"), wherein sending the assigned first set of TNs to the first customer comprises sending the assigned first set of TNs to the first customer via the API.

19. The system of claim 11, wherein the one or more first network interconnection characteristics are based on microservice data, wherein the microservice data comprises at least one of:
- data regarding existence of partner validation between the call network service provider and the first entity service provider;
- data regarding lack of partner validation between the call network service provider and the first entity service provider;
- data regarding partner peering model attributes comprising at least one of one or more TN attributes, one or more fully qualified domain name ("FQDN") attributes, one or more trunk group ("TGRP") attributes, one or more X-Header attributes, or one or more user identification ("ID") attributes;
- data regarding existence of a public switch telephone network ("PSTN") provider route plan;
- data regarding lack of a PSTN provider route plan;
- data regarding existence of a first entity service provider route plan;
- data regarding lack of a first entity service provider route plan;
- data regarding existence of a PSTN provider rating;
- data regarding lack of a PSTN provider rating;
- data regarding existence of a rater of the first entity service provider;
- data regarding lack of a rater of the entity rater;
- data regarding telephone number ("TN") attributes comprising at least one of one or more TN digit attributes or one or more TN type attributes;
- data regarding existence of a redundancy model;
- data regarding lack of a redundancy model; or
- data regarding redundancy type attributes comprising at least one of one or more geographical attributes per region or overflow attributes.

* * * * *